United States Patent [19]

Kneubuehl

[11] 4,248,178
[45] Feb. 3, 1981

[54] POULTRY WATERING CUP

[75] Inventor: Herman J. Kneubuehl, Sterling, Ohio

[73] Assignee: Klean Kup Systems, Inc., Smithville, Ohio

[21] Appl. No.: 50,178

[22] Filed: Jun. 20, 1979

[51] Int. Cl.³ .............................................. A01K 7/00
[52] U.S. Cl. ..................................................... 119/75
[58] Field of Search ................................. 119/75, 72.5

[56] References Cited
U.S. PATENT DOCUMENTS

| | | | |
|---|---|---|---|
| 2,319,928 | 5/1943 | Hart | 119/75 |
| 3,550,560 | 12/1970 | Edstrom | 119/72.5 |
| 3,602,197 | 8/1971 | Fioretto | 119/72.5 |
| 3,756,199 | 9/1973 | Clark | 119/72.5 |

Primary Examiner—Jay N. Eskovitz
Attorney, Agent, or Firm—Hamilton, Renner & Kenner

[57] ABSTRACT

A poultry watering cup (26) having a tubular valve housing (11) with spaced apart annular valve seats (31 and 33), an O-ring (30) on one seat (31), a valve having a head (28) seated on said O-ring (30) and a stem (24) extending loosely through said O-ring (30) for tilting said valve head (28) off said O-ring (30) by tilting said stem (24), and a valve disk (35) seated on said seat (33) in close proximity to said valve head (28), so as to be tilted off its seat (33) by tilting said valve head (28).

2 Claims, 6 Drawing Figures

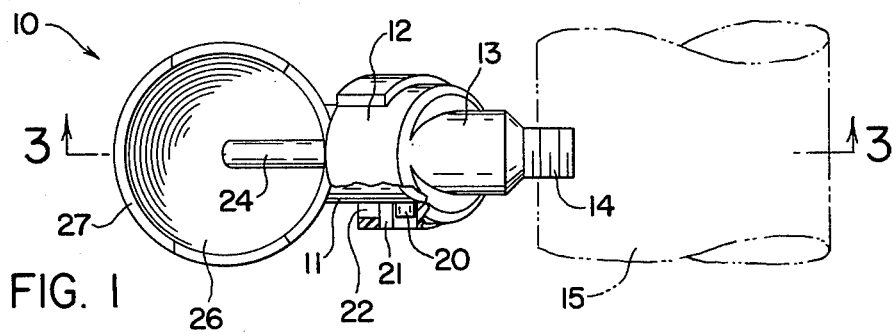
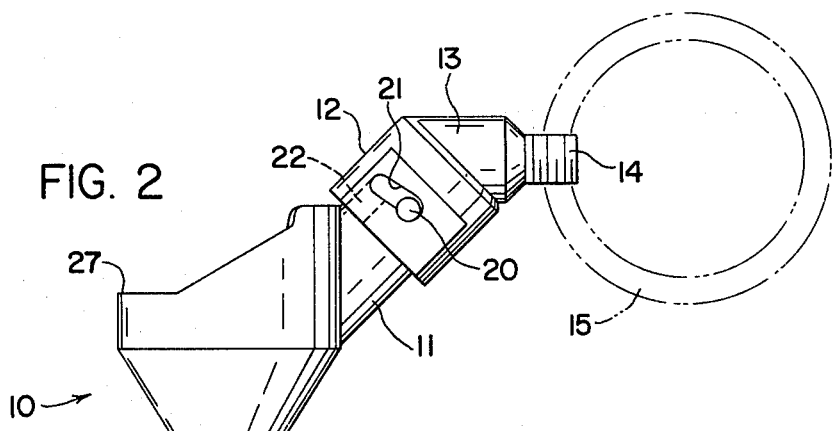
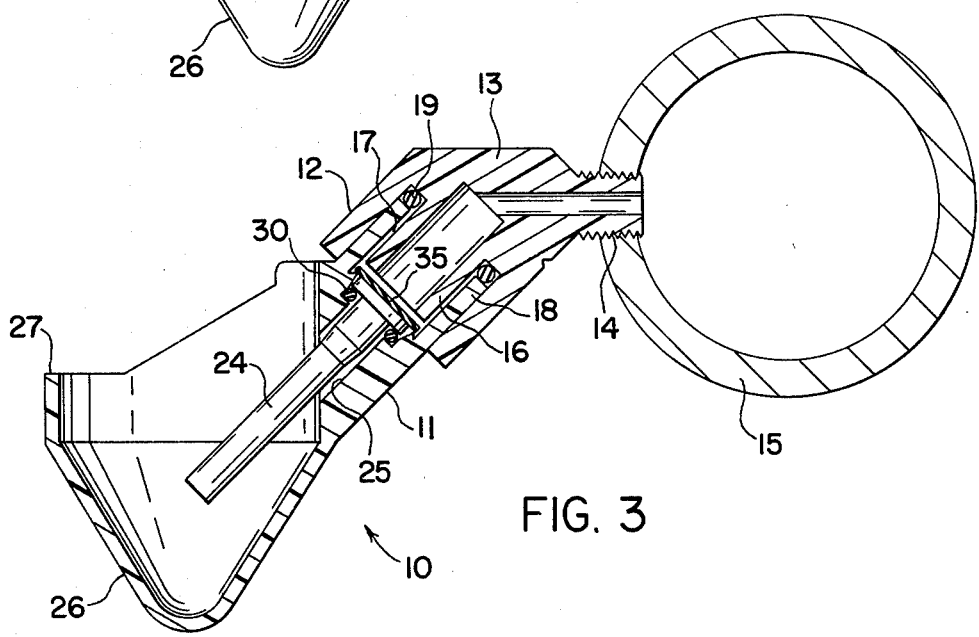

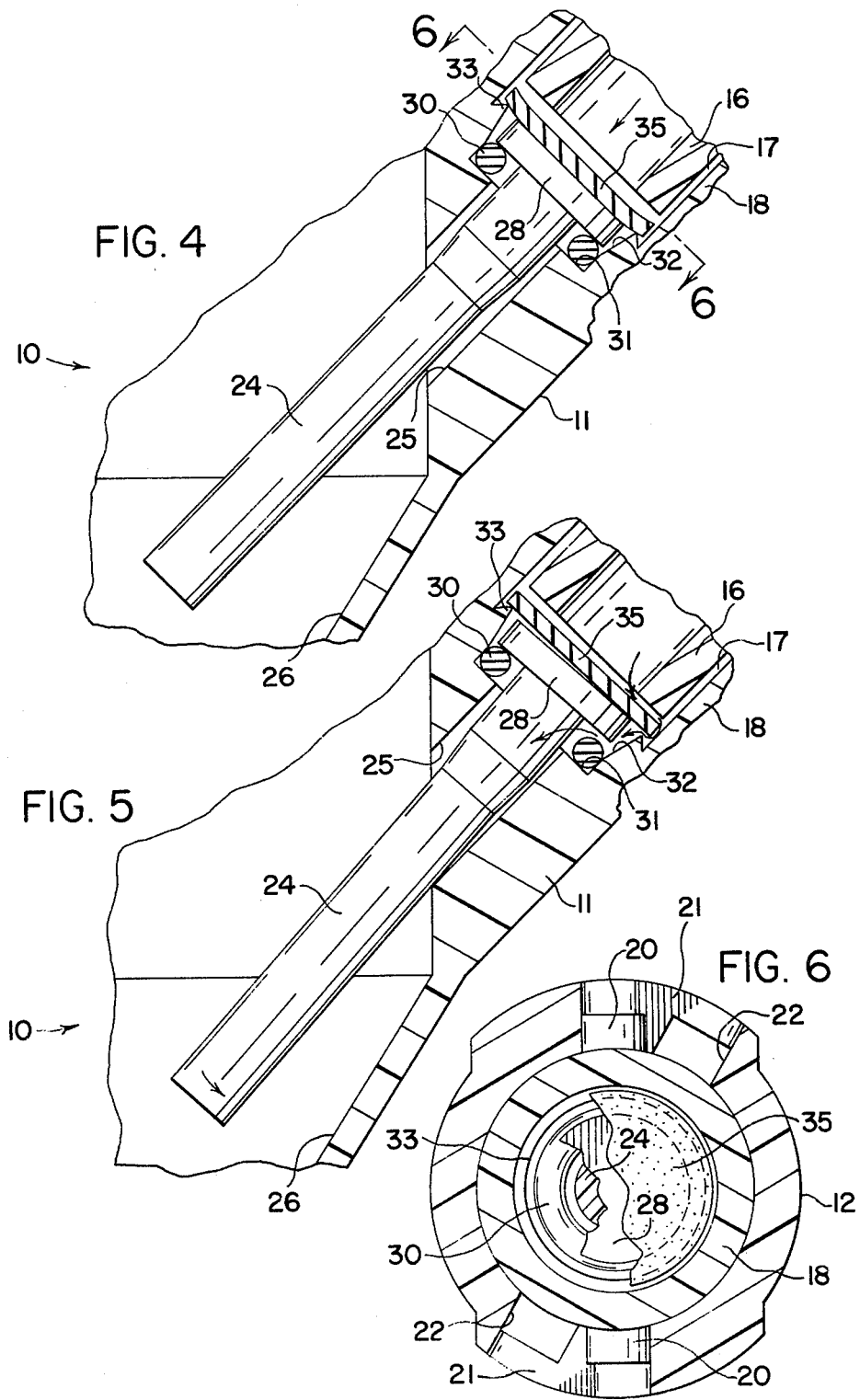

ized, and described in the specification herein as representing the best known mode of carrying out the invention. Various modifications and changes in details of construction are comprehended within the scope of the appended claims.

POULTRY WATERING CUP

TECHNICAL FIELD

Watering cups for supplying drinking water to poultry and having valves which are operated automatically to replenish the water by the unconscious action of the fowl drinking from the cup.

BACKGROUND ART

Present day chicken or poultry houses are normally equipped with a plurality of cages having water containers with normally closed valves connecting the containers to a water supply. Certain of such valves are adapted to be opened by a valve actuator in the container which is operated by the chicken pecking or pushing on the actuator, which may be a stem extending from the valve into the container. Difficulties have been had with such valves for several reasons; the chickens may never learn to move the stem and the valve may become clogged with feed or foreign matter which interferes with its operation.

In my prior U.S. Pat. No. 3,483,847, a poultry watering cup is disclosed having a valve construction designed to overcome the foregoing difficulties. The valve shown therein has a double seat to effect a better and more positive seal, and the valve stem is positioned to extend down into a relatively small cup so that as the water lever therein is lowered the chicken will unconsciously tilt the stem as it drinks and open the valve to admit water into the cup.

However, I have discovered that the construction of U.S. Pat. No. 3,483,847 was not entirely satisfactory under certain conditions. The two valve seats shown therein are stepped flat surfaces on one of which the flat shoulder of the head of the valve seats, and on the other a flat disk valve seats. A flat valve disk will seal tightly against a flat seat only at high or medium water pressure, and it is very important to provide for a tight seal at low water pressure as today millions of day old chicks are started in cages and they can activate the water cups only at very low water pressure. Moreover, the seats become contaminated by any foreign matter carried in the water supply. Further, in the event the pressure of the water supply is lost and a leak occurs in the system tending to siphon drinking water from above the cup, the space above the upper valve disk is such as to allow it to lift off its seat and become wedged in the internal threads to the extent that it may not prevent siphoning. The result may be that feed particles from the cup become lodged under the valves causing them to leak, and bacteria and feed particles will contaminate the water feed lines, requiring replacement of the entire water system.

DISCLOSURE OF INVENTION

The present invention provides a construction which overcomes the foregoing difficulties, and embodies a simple, economical and easily operated poultry watering cup.

It is an object of the present invention to provide an improved poultry watering cup having efficient sharp line contact valve surfaces to insure adequate seals in both high and low pressure operation.

Another object is to provide an improved poultry watering cup having self-cleaning valve surfaces.

A further object is to provide an improved poultry watering cup having an O-ring adapted to seat against the head of a valve stem.

Still another object is to provide an improved poultry watering cup having an upper valve disk, and an internal inlet tube terminating in a seat closely above said disk against which the disk seals in the event it lifts off its seat due to siphoning, without allowing the disk to become cocked or wedged and lose sealing contact.

A further object is to provide an improved poultry watering cup having a two-part housing connected together by a bayonet lock to provide quick assembly and disassembly and a positive location for the seat on the end of the inlet tube relative to the upper valve disk.

These and other objects are accomplished by the parts, combinations and improvements comprising the present invention, a preferred embodiment of which is shown by way of example in the drawings and described in the specification herein as representing the best known mode of carrying out the invention. Various modifications and changes in details of construction are comprehended within the scope of the appended claims.

BRIEF DESCRIPTION OF DRAWINGS

FIG. 1 is a plan view of the improved watering cup.
FIG. 2 is a side elevation thereof.
FIG. 3 is an enlarged sectional view on line 3—3 of FIG. 1.
FIG. 4 is a further enlarged partial sectional view similar to FIG. 3, showing the valves in closed position.
FIG. 5 is a similar view showing the stem tilted to open the valves.
FIG. 6 is a cross-sectional view on line 6—6 of FIG. 4.

PREFERRED EMBODIMENT FOR CARRYING OUT INVENTION

The improved watering cup is indicated generally at 10 and has a tubular valve housing 11 extending angularly upward therefrom, preferably at an angle of about 45° to the vertical. A connector tube 12 is adapted to telescope over the upper portion of the valve housing 11 and is provided with a 45° elbow portion 13 terminating in an externally threaded stub 14 adapted to screw into a water supply pipe or manifold 15.

The connector tube 12 is provided with an inner tubular portion 16 forming an annular groove 17 for receiving the upper tubular end 18 of valve housing 11, and an O-ring seal 19 in the upper end of groove 17 abuts the end of tube 18 and provides a positive location for the lower end of tubular portion 16 within the tubular end 18 of the valve housing 11.

The tubular end 18 is preferably provided with diametrically opposite pins 20 which are received in circumferential slots 21 in connector tube 12 and rotated to one end of the slots as seen in FIG. 2, to lock the tubular portions 16 and 18 together with the end of tube 18 in abutment with O-ring 19. As best shown in FIGS. 1 and 6, inner longitudinal slots 22 in the tube 12 communicate with slots 21 to allow disconnecting the parts 10 and 11 when the pins 20 are rotated to the opposite ends of slots 21 in the usual operation of a bayonet lock.

As shown in FIGS. 3-5, a valve stem 24 extends loosely through the bore 25 of valve housing 11 downwardly into the cup portion 26 so as to be well below the water level normally maintained below the outer lip 27 of the cup. The valve stem 24 has a disk-like head 28 on its upper end of larger diameter than the stem, and the under annular extension of the head is adapted to seat on a small O-ring 30 positioned on an annular shoulder 31 formed in the valve housing 11. Above the shoulder the inner walls of the housing form a 90° angle with shoulder 31 to contain the O-ring 30 and then taper outwardly upward as indicated at 32 and terminate in a sharp annular shoulder 33. The inner diameter of the O-ring 30 is substantially greater than the diameter of stem 24, so that a substantial clearance is maintained between the stem and the O-ring.

A flat resilient valve disk 35 is adapted at its outer periphery to seat on the shoulder 33 which is preferably sharp or angular to provide a line contact and insure a positive seal at both high and low pressures so that it works equally well for mature hens or day old chicks without changing the configuration of the actuating stem 24. As shown in FIGS. 4 and 5, the valve disk is spaced from the lower end of tube 16 a slight distance, of the order of 0.019", so that in the case of siphoning the disk will seat on the end of tube 16 without any danger of becoming tilted so as to fail to seat. Obviously, the end of tube 16 can be beveled to provide a circular line seat.

As indicated in FIG. 4, the incoming water pressure from supply tube 15 forces the valve disk 35 to seat on the shoulder 33 and the valve head 28 to seat on the O-ring 30 which is in turn seated on shoulder 31. As seen in FIG. 5, when a chicken drinking from cup 26 pushes its beak or its head against the lower part of valve stem 24 to move it laterally, the valve head 28 is tilted off the O-ring 30 and the valve head contacts one side of the valve disk 35 and tilts or lifts it off the seat 33 at one side, thereby momentarily allowing water from the supply line to trickle through the bore 25 and along the stem into the cup.

Due to the clearance between the stem and O-ring 30, the O-ring always remains seated on shoulder 31 as the stem is tilted.

The smooth rounded seating surface of the O-ring 30 and the sharp angular seat 33 provide circular line seats which are self-cleaning and which insure positive sealing at two places. The bayonet lock connection between the valve housing 11 and the connector tube 12 provides quick connection or disconnection and a positive location of the end of the inner tube 16 against which the valve disk seats if it lifts off seat 33 when siphoning occurs, and the close spacing between the disk and tube end, together with the smooth inner surface of groove 17, obviates any tendency of the disk to become tilted and fail to seat on tube 16 during siphoning.

As the lower end of the valve stem is normally under water with only a short intermediate portion visible, a chicken may drink from the cup without contacting the stem, and when the water level is lowered the chicken will, in reaching down into the cup, contact the stem to move it laterally and replenish the water in the cup. As soon as the water level is raised the chicken automatically backs off and does not contact the stem, so that the water does not overflow the cup.

Preferably, the valve housing 11 and connector tube 12 are made of molded plastic material, as well as valve stem 24. However, a variety of suitable materials may be used.

The improved watering cup is simple and economical to manufacture and easy to assemble or disassemble. It provides positive sealing in operation and protection against siphoning.

I claim:

1. A poultry watering cup having an upwardly inclined tubular housing forming a valve chamber, an annular seat in said chamber, an O-ring on said seat, a valve having a head normally seated on said O-ring and a stem extending through said O-ring and tubular housing in spaced relation thereto and into said cup so that the valve head is tiltable off said O-ring by lateral movement of said stem, a second annular and sharp seat in said housing above said first seat, a resilient valve disk normally seated on said second seat in close proximity to said valve head so as to be tilted off its seat by tilting of said head, and a connector tube telescoped over said tubular valve housing and having an inner water supply tube terminating closely adjacent to said valve disk for sealing against said disk during reverse flow of water through said supply tube.

2. A poultry watering cup as described in claim 1, wherein said valve housing and said connector tube have interengaging bayonet lock means positively positioning said inner annular water supply tube closely adjacent to said valve disk.

* * * * *